United States Patent
Broumas et al.

(10) Patent No.: US 10,733,284 B2
(45) Date of Patent: Aug. 4, 2020

(54) TRUSTED EXECUTION ENVIRONMENT SECURE ELEMENT COMMUNICATION

(71) Applicant: Samsung Electronics Co., Ltd, Suwon-si (KR)

(72) Inventors: Antonios Dimitrios Broumas, Oakland, CA (US); Naman R. Patel, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 15/287,688

(22) Filed: Oct. 6, 2016

(65) Prior Publication Data
US 2018/0101677 A1    Apr. 12, 2018

(51) Int. Cl.
| | |
|---|---|
| G06F 11/30 | (2006.01) |
| G06F 12/14 | (2006.01) |
| G06F 21/53 | (2013.01) |
| G06F 21/44 | (2013.01) |
| G06F 21/57 | (2013.01) |
| H04L 9/00 | (2006.01) |
| H04L 9/32 | (2006.01) |
| H04L 9/08 | (2006.01) |
| G06F 21/60 | (2013.01) |
| G06F 21/74 | (2013.01) |

(52) U.S. Cl.
CPC .......... *G06F 21/53* (2013.01); *G06F 21/44* (2013.01); *G06F 21/575* (2013.01); *G06F 21/606* (2013.01); *G06F 21/74* (2013.01); *H04L 9/006* (2013.01); *H04L 9/0838* (2013.01); *H04L 9/0869* (2013.01); *H04L 9/3273* (2013.01); *G06F 21/57* (2013.01)

(58) Field of Classification Search
USPC ........................................................ 713/190
See application file for complete search history.

(56) References Cited

U.S. PATENT DOCUMENTS

| | | | |
|---|---|---|---|
| 2003/0084285 A1* | 5/2003 | Cromer ................. | G06F 21/554 713/164 |
| 2013/0042295 A1* | 2/2013 | Kelly ..................... | G06F 21/53 726/1 |
| 2013/0129087 A1* | 5/2013 | Qi .......................... | G06F 21/602 380/44 |
| 2014/0317686 A1* | 10/2014 | Vetillard ................ | G06F 21/74 726/2 |
| 2015/0007313 A1* | 1/2015 | Mackintosh .......... | G06F 21/575 726/22 |

(Continued)

OTHER PUBLICATIONS

"TrustZone Ready Program: Mapping security use cases to SoC requirements", Tech Seminar, https://www.arm.com/files/pdf/Tech_seminar_TrustZone_v7_PUBLIC.pdf, 2016, 11 pages.

(Continued)

*Primary Examiner* — Wasika Nipa
*Assistant Examiner* — Samuel Ambaye (57) ABSTRACT

A method and apparatus are provided for secure communication. The method includes binding an isolated environment, of a device, to a secure component. The secure component includes a secure application and data. The method also includes utilizing the isolated environment as an intermediary for communication of the data between the secure application and the device.

17 Claims, 9 Drawing Sheets

(56) References Cited

U.S. PATENT DOCUMENTS

2015/0244711 A1* 8/2015 Venkataraman ...... H04L 9/0863
                                                    713/156
2016/0007188 A1    1/2016 Wane

OTHER PUBLICATIONS

GlobalPlatform Card Specification, Version 2.2, Mar. 2006, 375 pages.
Global Platform Card Technology Secure Channel Protocol 03 Card Speficiation v 2.2—Amendment D Version 1.1, GPC_SPE_014, Sep. 2009, 29 pages.
Global Platform Card Technology Secure Channel Protocol '11' Card Specification v2.2—Amendment F Version 1.0, GPC_SPE_093, May 2015, 39 pages.
Supplementary European Search Report dated Jun. 17, 2019 in connection with European Patent Application No. 17 85 8755, 7 pages.

* cited by examiner

TRUSTED EXECUTION ENVIRONMENT SECURE ELEMENT COMMUNICATION

TECHNICAL FIELD

This disclosure relates generally to secure communications. More specifically, this disclosure relates to a method and apparatus for trusted execution environment secure element communication.

BACKGROUND

Sensitive information and private keys are often stored in secure elements that may or may not be physically attached to a device. Usually a normal world application has to provide some form of authentication to access the secure element. Additionally the application will need to provide authentication if the application is going to store data in the secure element. However, a normal world execution environment is susceptible to a variety of attacks that would comprise the authentication.

SUMMARY

Embodiments of the present disclosure a method and apparatus for trusted execution environment secure element communication.

In one example embodiment, a method is provided for secure communication. The method includes binding an isolated environment, of a device, to a secure component. The secure component includes a secure application and data. The method also includes utilizing the isolated environment as an intermediary for communication of the data between the secure application and the device.

In another example embodiment, an apparatus is provided for secure communication. The apparatus includes a memory element configured to store data. The apparatus also includes at least one processor coupled to the memory element. The at least one processor is configured to determine communication capability of another device for receiving data. The processor is also configured to bind an isolated environment, of the apparatus, to a secure component. The secure component includes a secure application and the data. The processor is also configured to utilize the isolated environment as an intermediary for communication of the data between the secure application and the apparatus.

In yet another example embodiment, a non-transitory computer-readable medium is provided for secure communication. The non-transitory computer-readable medium comprising instructions for secure communication that, when executed by at least one processor, causes an electronic device to bind an isolated environment, of the apparatus, to a secure component, wherein the secure component includes a secure application and data. The instructions also cause the processor to utilize the isolated environment as an intermediary for communication of the data between the secure application and an application of the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
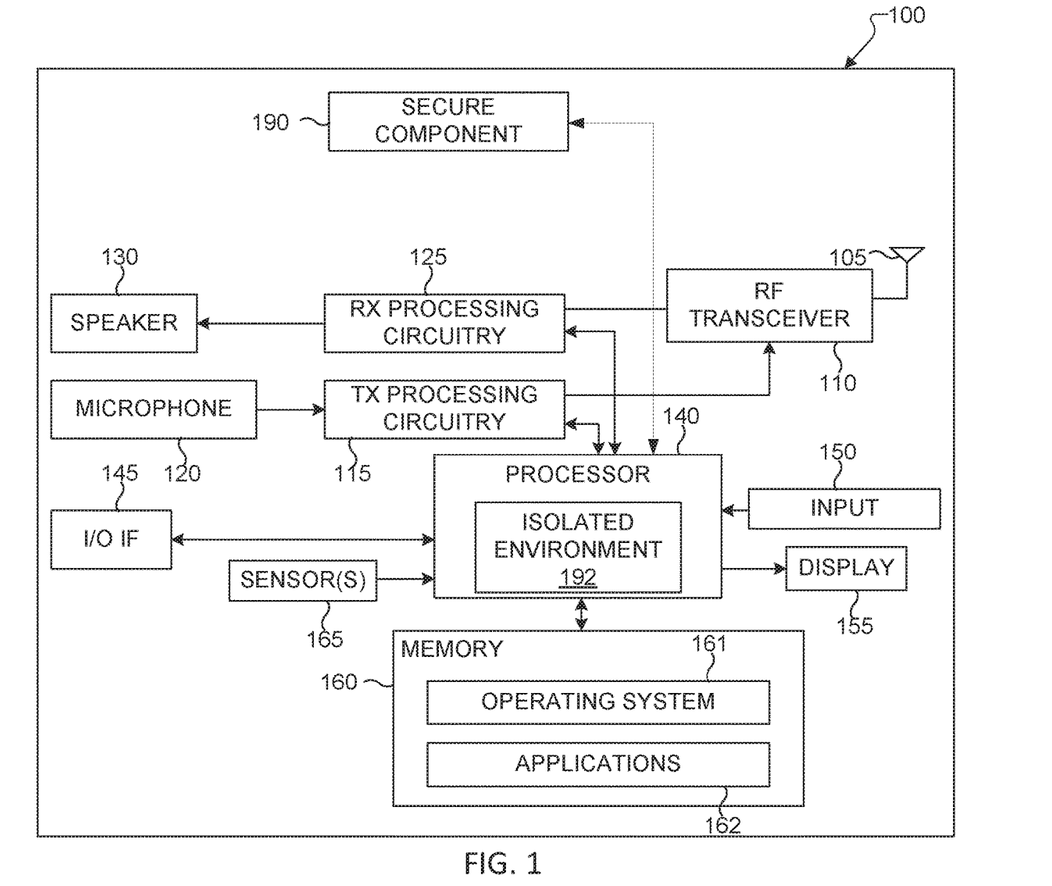
FIG. 1 illustrates user equipment (UE) in which one or more embodiments of the present disclosure may be implemented.

FIG. 1 illustrates user equipment (UE) 100 in which one or more embodiments of the present disclosure may be implemented. The embodiment of the UE 100 illustrated in FIG. 1 is for illustration only, the UE 100 comes in a wide variety of configurations, and FIG. 1 does not limit the scope of this disclosure to any particular implementation of a UE.

In various embodiments, the UE 100 may take different forms, and the present disclosure is not limited to any particular form. For example, the UE 100 may be a mobile communication device, such as, for example, a mobile station, head mountable display, a subscriber station, a wireless terminal, a smart phone, a tablet, etc., that is useable with data transfer applications, such as payment applications.

As shown in FIG. 1, the UE 100 includes an antenna 105, a radio frequency (RF) transceiver 110, transmit (TX) processing circuitry 115, a microphone 120, and receive (RX) processing circuitry 125. The UE 100 also includes a speaker 130, a processor 140, an input/output (I/O) interface (IF) 145, a touchscreen 150, a display 155, a memory 160, one or more sensors 165, and secure component 190. The memory 160 includes an operating system (OS) 161 and one or more applications 162.

The RF transceiver 110 receives, from the antenna 105, an incoming RF signal transmitted by an access point (e.g., base station, Wi-Fi router, Bluetooth device) for a network (e.g., a Wi-Fi, Bluetooth, cellular, 5G, LTE, LTE-A, WiMAX, or any other type of wireless network). The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The processor 140 can include one or more processors or other processing devices and execute the OS 161 stored in the memory 160 in order to control the overall operation of the UE 100. For example, the processor 140 could control the reception of forward channel signals and the transmission of reverse channel signals by the RF transceiver 110, the RX processing circuitry 125, and the TX processing circuitry 115 in accordance with well-known principles. In some embodiments, the processor 140 includes at least one microprocessor or microcontroller.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the UE 100 with the ability to connect to other devices, such as laptop computers and handheld computers. The I/O interface 145 is the communication path between these accessories and the processor 140.

The processor 140 is also coupled to the input 150 (e.g., keypad, touchscreen, button etc.) and the display 155. The operator of the UE 100 can use the input 150 to enter data into the UE 100. The display 155 can be a liquid crystal display, a light-emitting diode (LED) display, an optical LED (OLED), an active matrix OLED (AMOLED), or other display capable of rendering text and/or at least limited graphics, such as from web sites.

The input 150 can include a touch panel, a (digital) pen sensor, a key, or an ultrasonic input device. The input 150 can recognize, for example, a touch input in at least one scheme among a capacitive scheme, a pressure sensitive scheme, an infrared scheme, or an ultrasonic scheme. The input 150 can also include a control circuit. In the capacitive scheme, the input 150 can recognize touch or proximity.

The memory 160 is coupled to the processor 140. Part of the memory 160 could include a random access memory (RAM), and another part of the memory 160 could include a Flash memory or other read-only memory (ROM).

UE 100 further includes one or more sensors 165 that can meter a physical quantity or detect an activation state of the UE 100 and convert metered or detected information into an electrical signal. For example, sensor 165 may include one or more buttons for touch input, e.g., on the headset or the UE 100, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein. The sensor(s) 165 can be used to determine an orientation and facing direction of the UE for a video. Any of these sensor(s) 165 may be located within the UE 100, within a headset configured to hold the UE 100, or in both the headset and UE 100, for example, in embodiments where the UE 100 includes a headset.

The secure component 190 can be a secure element (SE) that is a tamper-resistant platform (e.g., a one chip secure microcontroller) capable of securely hosting applications and their confidential and cryptographic data (e.g. key management). Different examples of a secure component 190 can include, but are not limited to, a universal integrated circuit card (UICC), embedded SE, and microSD. The secure component 190 can be part of the UE 100 removable. For example, in one embodiment, both the UICC and microSD are removable. In further embodiments, the secure component 190 can be presented as a software component rather than a hardware component. Additionally, UE 100 can include circuitry for the interface between the components of the UE 100 and the secure element 190.

The processor 140 can also include an isolated environment 192. The isolated environment 192 can be a System on Chip (SoC) security component. The isolated environment 192 can be a hardware-based security in a SoC to provide secure end points and a device root of trust. In one embodiment, the secure component 190 may communicate with applications 162 through the processor 140 and isolated environment 192.

Although FIG. 1 illustrates one example of UE 100, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). As another example, the secure component 190 can be physically separate from UE 100, combined with the circuitry 115 and 125, combined with RF transceiver 110, or part of I/O IF 145. Also, while FIG. 1 illustrates the UE 100 configured as a mobile telephone, tablet, or smartphone, the UE 100 could be configured to operate as other types of mobile or stationary devices.

One or more embodiments of this disclosure recognize and take into account that sensitive information may be stored in SEs. Accessing this information or storing additional information by applications in the normal world can provide authentication issues or open the SE up to attacks. Current solutions only have the normal world application provide authentication to the SE to access it, but such authentication may not be reliable as the normal world application may be compromised. The various embodiments of this disclosure provide methods and a system for secure communication between a trusted execution environment (TEE) and a SE. Secure communications is performed by cryptographically binding an isolated environment of a device and a secure component, wherein the secure component includes secure applications and data. Secure communications is also performed by utilizing the isolated environment as an intermediary for communications between the application and secure component.

As described in more detail below, the UE 100 can be used to redirect all applications to secure element communication through an isolated environment such that during data exchanges it can be determined if the device is compromised. One such process for identifying a compromise is by using a trusted boot feature. One or more embodiments of this disclosure provide securely executed cryptographic operations in an isolated environment. One or more embodiments of this disclosure also provide securely storing credentials used for authentication and verification in an isolated environment. One or more embodiments of this disclosure provide a secure protocol between an isolated environment and the secure component 190.

Figure 2:
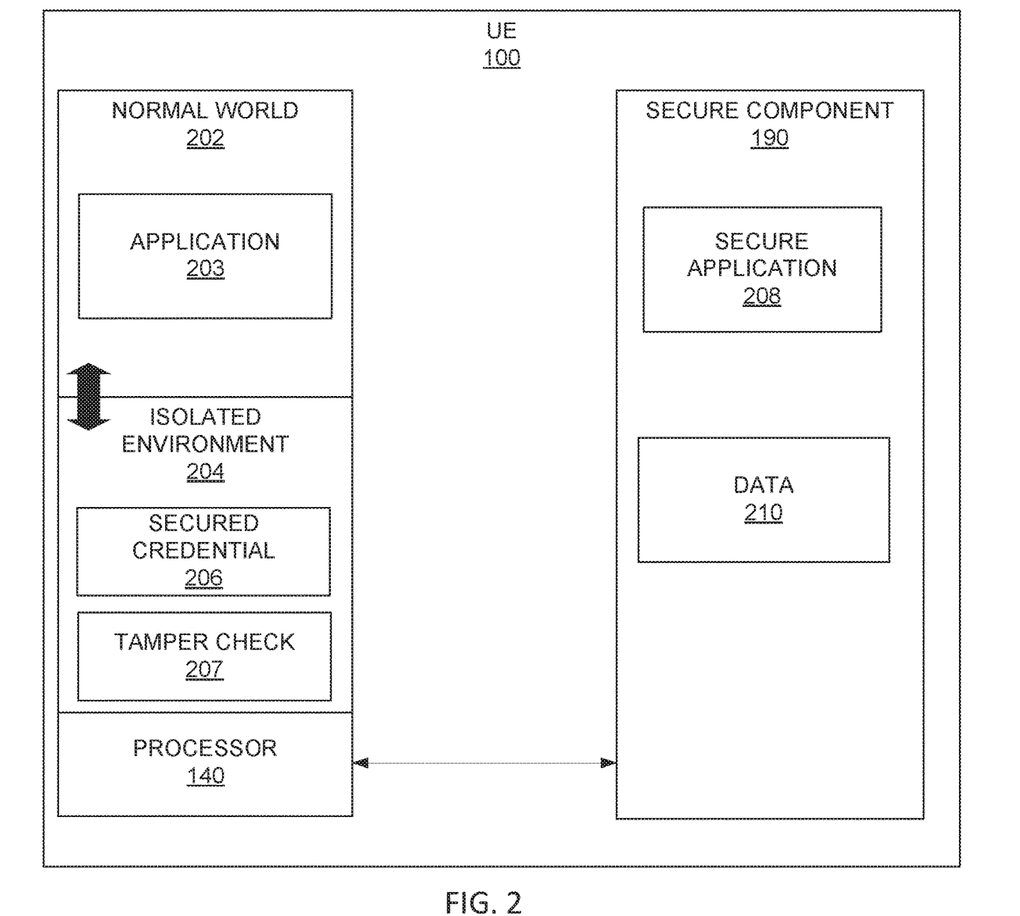
FIG. 2 illustrates an example UE for use in secure communication in accordance with an embodiment of this disclosure.

FIG. 2 illustrates an example UE 100 for use in secure communication in accordance with an embodiment of this disclosure. The embodiment of the UE 100 illustrated in FIG. 2 is for illustration only. UEs for secure communication can come in a wide variety of configurations, and FIG. 2 does not limit the scope of this disclosure to any particular implementation of a UE for secure communication. The UE 100 as shown in FIG. 2 includes a more detailed view of addition components of the UE 100 as shown in FIG. 1.

In FIG. 2, the UE 100 includes a processor 140, secure component 190 with secure application 208, secured credentials 209 and data 210, normal world 202 with application 203, and isolated environment 204 with secured credentials 206 and tamper check 207. In the UE 100, the security of the system is achieved by partitioning all of the system on chip hardware and software resources to exist in one of two worlds, the secure world for the security subsystem such as isolated environment 204, and the normal world 202 for everything else.

The normal world 202 can be a non-secure area of system on chip hardware and software resources. The normal world 202 can include an application 203 operating in an unsecure manner on the operating system.

The isolated environment 204 is a secure area of system on chip hardware and software resources, such as, for example, the main processor of a mobile device, such as a smart phone (or any connected device including tablets, set-top boxes and televisions). The isolated environment 204 enables code and data loaded inside to be protected with respect to confidentiality and integrity. The isolated environment 204 can be referred to herein as a trust zone, secure world, or TEE. The isolated environment 204 may be one example of isolated environment 192 as shown in FIG. 1.

Each of the isolated environment 204 and secure component 190 include secured credentials 206 and 209, respectively. The secured credentials 206 and 209 can include information for use in a public key infrastructure or a symmetric encryption. The isolated environment 204 can perform trusted boot attestation, and has access to a private key that matches a certificate that is certifiable by a chain ending to a manufacturer certificate of authority. Similarly, the secure component 190 has access to the private key that matches a certificate that is certifiable by a chain ending to a manufacturer certificate of authority. The manufacturer certificate of authority can be hardcoded into the secure component.

The isolated environment 204 can include a tamper check 207 to determine whether an application 203 in the normal world 202 is compromised and will prevent the further processing of the data 210 received from the secure component 190 if tampering is detected. The tamper check 207 may include trusted boot verification, normal world applications signature verification, complete file system signature verification, geolocation checks, connectivity to secure server checks, and the like. In further example embodiments, the tamper check 207 may perform biometric checking (e.g., fingerprint or iris scan), user specific knowledge verification (e.g., password), special hardware possession providing a one time password (OTP), and the like. The normal world 202 and isolated environment 204 can share hardware and software resources and data. In one or more embodiments, data can be exchanged between the normal world 202 and isolated environment 204.

In one or more embodiments, the UE 100 can redirect all communications between the application 203 and the secure component 190, and the communications between secure application 208 and the normal world 202 through the isolated environment 204 and the processor 140. The communications can be sent through a bus connecting the secure component 190 to the processor 140. The redirected communications can be encrypted to avoid security attacks in the normal world 202. The isolated environment can implement a trusted boot feature such that at least part of the isolated environment will be encrypted and user input can be used to decrypt and active. The isolated environment 204 can ensure secure cryptographic operations. The isolated environment 204 can include security credential 206 used for authentication and verification. The isolated environment 204 and secure component 190 can implement a secure protocol. Even though the secure component 190 may be physically attached to the UE 100 hosting the isolated environment 204, they can be considered distinct security domains.

In one embodiment of this disclosure, the isolated environment 204 can provide attestation services only if trusted boot passes. If the isolated environment 204 passes a PIN (e.g., nonce) or other sensitive data to the secure application 208 through the normal world 202, the data can be encrypted. Data 210 coming from the secure component 109 responses can also be encrypted. The communications can occur through a secure channel that may be encrypted through the use of asymmetric key or public key infrastructure.

In one example embodiment, the secure messages between the isolated environment 204 and secure component 190 can include, from the isolated environment 204 to the secure component 190:

TS_A: encrypted by SE's public key and signed by TEE's private key; and

TS_S: encrypted by negotiated symmetric key.

The secure messages between the isolated environment 204 and secure component 190 can include, from the secure component 190 to the isolated environment 204:

ST_A: encrypted by TEE's public key and signed by SE's private key; and

ST_S: encrypted by negotiated symmetric key.

In one example, the secure messages can contain a nonce field to avoid replay attacks. The stream of nonce fields may be subject to additional verification checks by the secure component 190. ST_A and ST_S responses can incorporate the nonce submitted by the isolated environment 204.

At any time, the isolated environment 204 can send a type TS_A message/command. In one example, the TS_A messages take precedence and may change a state of connection. In a TS_A command, the isolated environment 204 can request a symmetrically encrypted session. In this example, the secure component 190 can declare agreement in a type ST_A message and pass the symmetric key to be used during the session. Subsequent communication can be carried out using TS_S and ST_S messages. Secure communications can be terminated by explicit TS_S or ST_S messages. An interlocutor may unilaterally choose to terminate secure communications if a certain number of decoding failures occurred (resulting in unexpected messages) or if a predetermined or randomly chosen time period has elapsed.

Different example embodiments can include different security checks. For example, trusted boot verification can be sent from the isolated environment 204 to the secure component 190 in a TS_A message. For a PIN transmission, either TS_A or TS_S messages can carry a confidential PIN payload. When using signatures by the private key of the secure component 190, either ST_A or ST_S messages can carry results of the cryptographic operations of the secure component 190.

One or more example embodiments can also provide operation using secure time. For example, if secure synchronous time is available to both the isolated environment 204 and secure component 190, then a timestamps stream can substitute a nonce. A heartbeat can also be used during prolonged idle periods of symmetric sessions.

Further, one or more example embodiments can also provide the use of device root keys (signed by a manufacturer certificate of authority). During manufacturing a first device root key (DRK) is made securely accessible to isolated environment 204 and second DRK is installed in the secure component 190. In another example, the same DRK private key may be accessible or installed to both the isolated environment 204 and secure component 190. In yet another example, during manufacturing the manufacturer certificate of authority public key is provided to both the isolated environment 204 and secure component 190.

In one or more of the examples, if DRK changes then all data can be wiped. Additionally, separate storage silos can exist per DRK.

Although FIG. 2 illustrates one example of UE 100, various changes may be made to FIG. 2. For example, various components in FIG. 2 could be combined, further subdivided, or omitted and additional components could be added according to particular needs. As a particular example, the processor 140 could be divided into multiple processors, such as one or more central processing units (CPUs) and one or more graphics processing units (GPUs). As another example, the secure component 190 can be physically separate from UE 100. Also, while FIG. 2 illustrates the UE 100 configured as a mobile telephone, tablet, or smartphone, the UE 100 could be configured to operate as other types of mobile or stationary devices.

Figure 3:
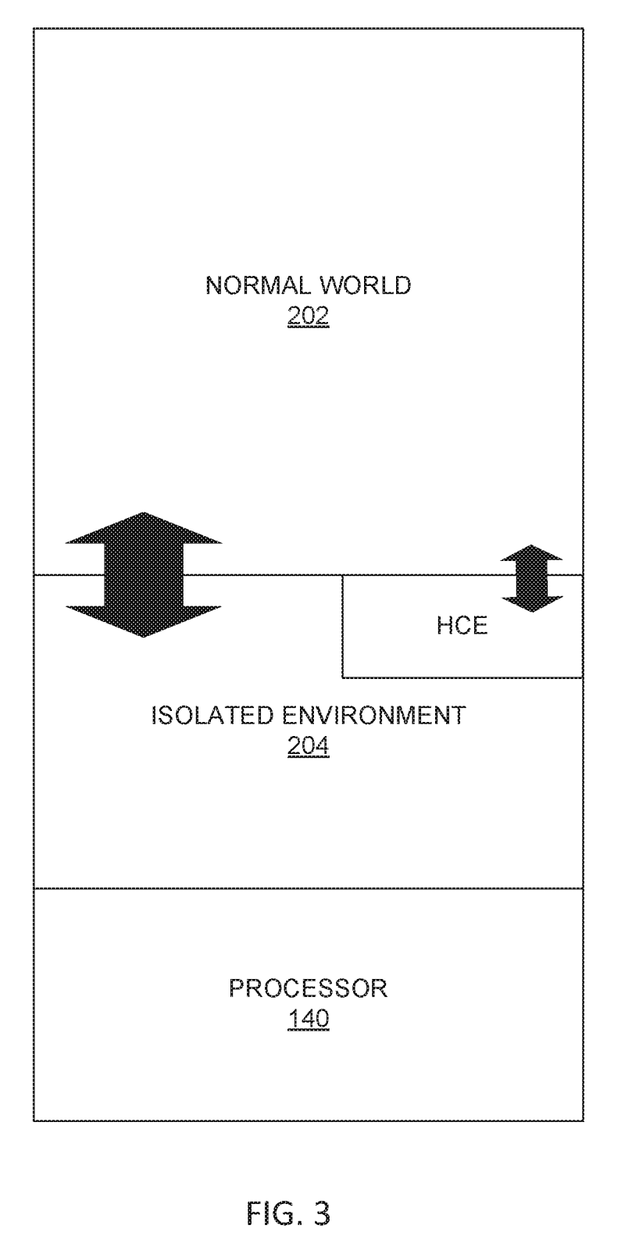
FIG. 3 illustrates an example UE for use in secure communication with a software based secure component in accordance with an embodiment of this disclosure.

FIG. 3 illustrates an example UE 100 for use in secure communication with a software based secure component in accordance with an embodiment of this disclosure. The embodiment of the UE 100 illustrated in FIG. 3 is for illustration only. UEs for secure communication can come in a wide variety of configurations, and FIG. 3 does not limit the scope of this disclosure to any particular implementation of a UE for secure communication. The UE 100 as shown in FIG. 3 includes a more detailed view of addition components of the UE 100 as shown in FIG. 1.

In FIG. 3, the UE 100 includes a host card emulation (HCE) 302 that acts as software based secure component, such as secure component 190 as shown in FIG. 1. HCE permits the UE 100 to perform card emulation on a near field communication (NFC)-enabled device without relying on access to a hardware based secure element. In this example, the HCE 302 can remain wholly within the isolated environment 204. In other examples, the HCE 302 can be partially within the isolated environment 204.

Although FIG. 3 illustrates one example of UE 100, various changes may be made to FIG. 3. For example, various components in FIG. 3 could be combined, further subdivided, or omitted and additional components could be added according to particular needs. As a particular example, the processor 140 could be divided into multiple processors, such as one or more central processing units (CPUs) and one or more graphics processing units (GPUs). As another example, the HCE 302 can be wholly with the normal world 202. Also, while FIG. 3 illustrates the UE 100 configured as a mobile telephone, tablet, or smartphone, the UE 100 could be configured to operate as other types of mobile or stationary devices.

Figure 4:
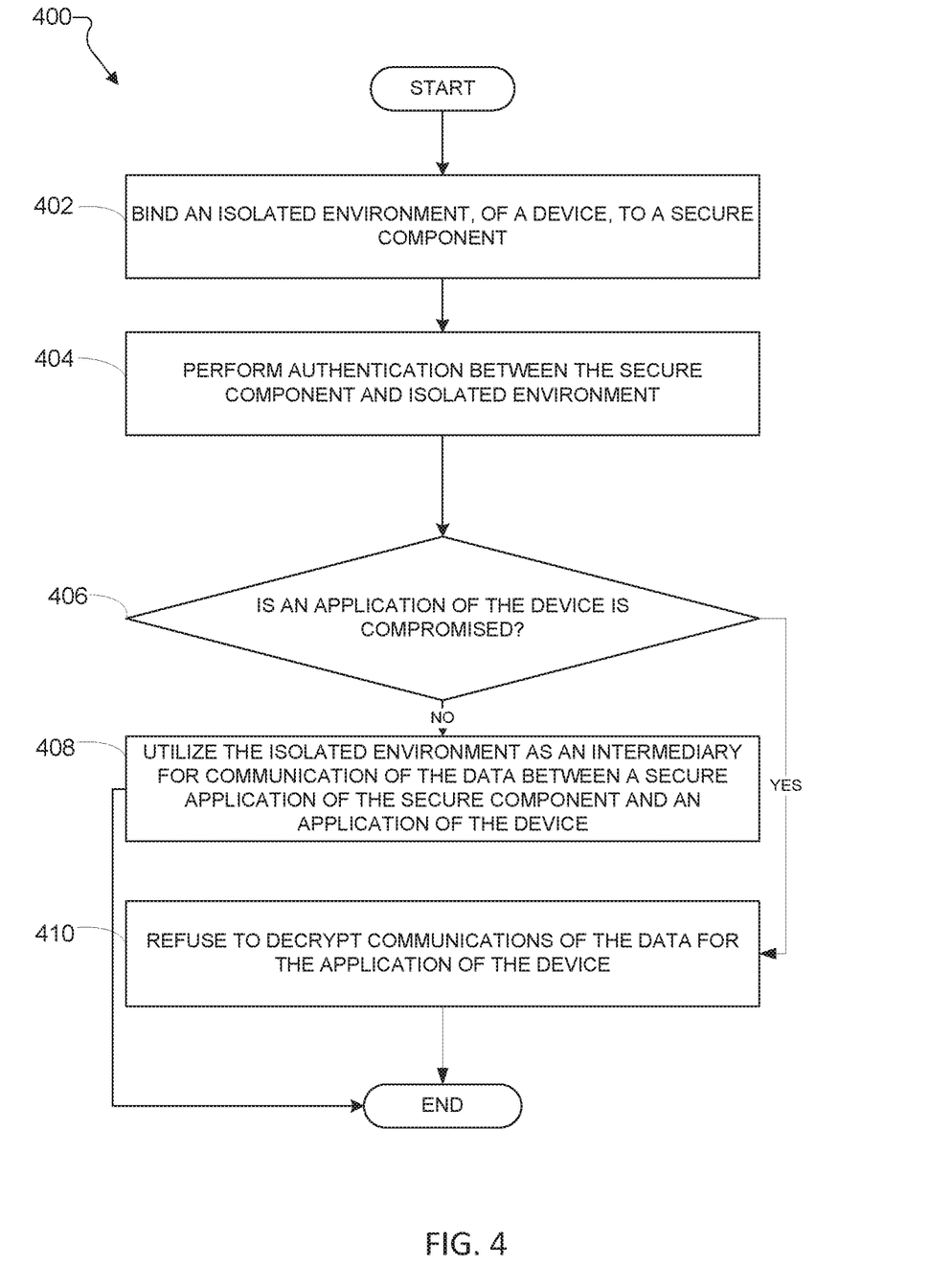
FIG. 4 illustrates a communication method switching system for communication method selection in accordance with an embodiment of this disclosure.

FIG. 4 illustrates a secure communication process 400 in accordance with an embodiment of this disclosure. The process 400 illustrated in FIG. 4 is for illustration only. Processes used to select a communication method can come in a wide variety of configurations, and FIG. 4 does not limit the scope of this disclosure to any particular implementation of communication method selection process.

In FIG. 4, the process 400 begins by, at step 402, by binding an isolated environment, of a device, to a secure component. The the secure component includes a secure application and data. For example, the device can bind the isolated environment to the secure component by establishing an encrypted communication channel between the isolated environment and the secure component.

At step 404, the device performs authentication between the secure component and the isolated environment. The authentication can include establishing a public key infrastructure or a symmetric encryption.

At step 406, the device determines whether the application of the device is compromised. The isolated environment can determine whether the application and normal world of the device is compromised through a tamper check. The tamper check can include providing a device root key and trusted boot attestation.

If the tamper check results in the application being compromised, at step 408, the device (i.e., isolated environment) refuses to decrypt communications of the data for the application. The communications originating from the secure component. If the tamper check results in the application not being compromised, at step 410, the device utilizes the isolated environment as an intermediary to decrypt the communications in the encrypted communication channel from the secure component. The communications ending at the application of the device in the normal world and originating in the secure application on the secure component.

Although FIG. 4 illustrates an example process 400 for communication method selection, various changes may be made to FIG. 4. For example, different steps of the process 400 could be combined, further subdivided, or omitted and additional steps could be added according to particular needs. As a particular example, the steps 406 and 410 could be removed. In this manner, the isolated environment would be used for secure communications, but would not participate in determining whether the application of the device is compromised. In yet another embodiment, step 404 may not be used and there would be no authentication performed. Although FIG. 4 illustrates an example process for secure communication, various changes could be made to FIG. 4. For example, while shown as a series of steps, various steps in each figure could overlap, occur in parallel, occur in a different order, or occur multiple times.

Figure 5:
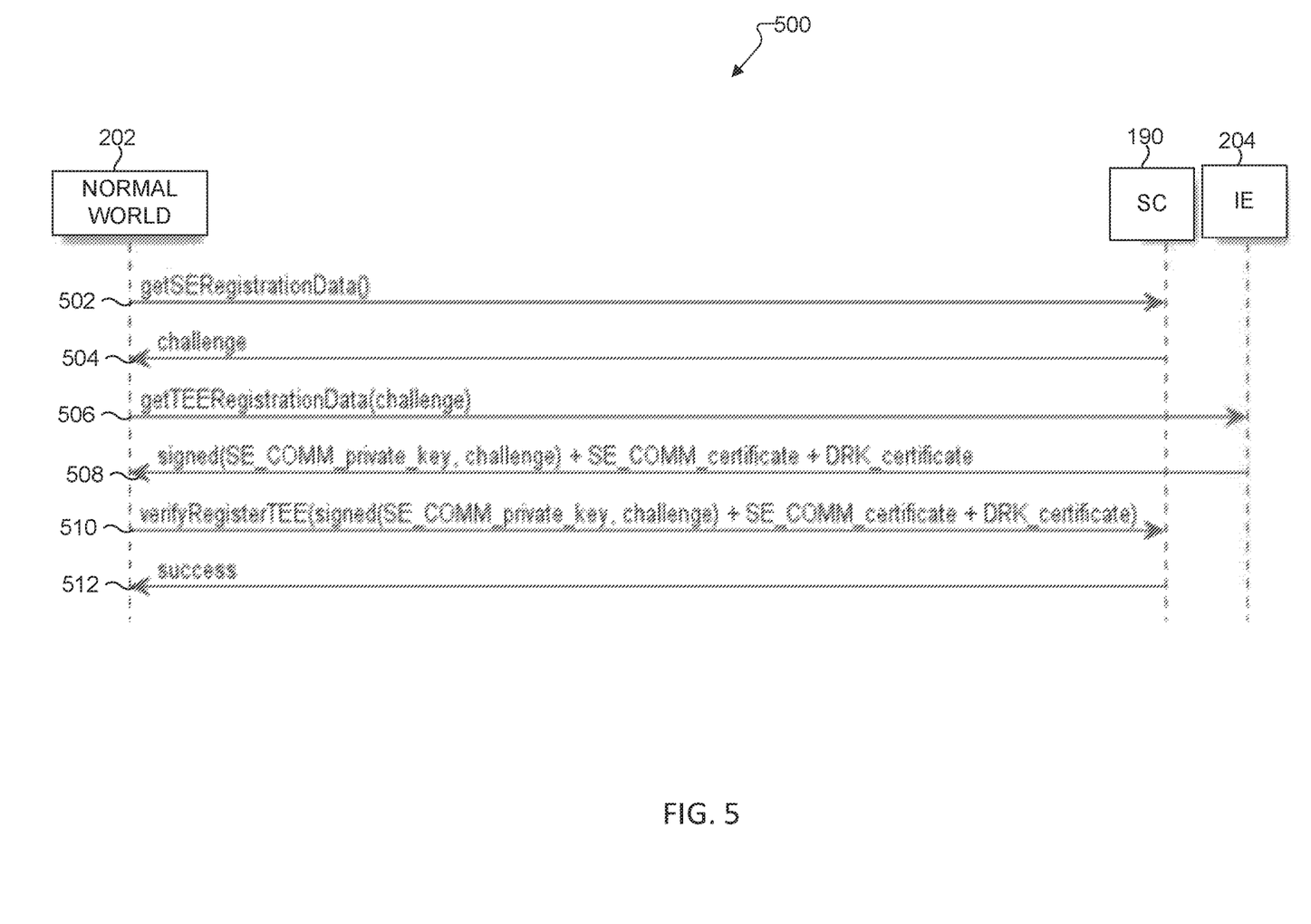
FIG. 5 illustrates a sequence diagram for an isolated environment (IE) 204 attesting to secure component (SC) 190 registration in accordance with an embodiment of this disclosure.

FIG. 5 illustrates a sequence diagram 500 for an isolated environment (IE) 204 attesting to secure component (SC) 190 registration in accordance with an embodiment of this disclosure. The diagram 500 includes a normal world 202, a secure component 190, and an isolated environment 204. In one example embodiment, the IE 204 can be a TEE, the SC 190 can be an SE, and the normal world 202 can be a unified computing system service. This sequence diagram 500 is for illustration only and different portions may be rearranged, added, or removed in different embodiments.

The sequence begins at 502 with the normal world 202 sending a request for secure element registration data from the SC 190. At 504, the SC 190 sends the normal world 202 a security challenge. The SC 190 can send a nonce as an encryption key to transmit some randomly generated information as the challenge, whereupon the IE 204 must return as its response a similarly encrypted value which is some predetermined function of the originally offered information, thus proving that it was able to decrypt the challenge. At 506, the normal world requests isolation environment registration data, using the challenge, from the IE 204. At 508, the IE 204 provide security credentials, such as signature using a private key of the SC 190 and challenge information, as well as a communication certificate and device root key certificate.

At 510, the normal world 202 verifies the security credentials with the SC 190. If the security credentials are correct, the SC 190 can return a success indicating that the SC registration 190 has been attested.

Although FIG. 5 illustrates an example process for an isolated environment (IE) 204 attesting to secure component (SC) 190 registration, various changes could be made to FIG. 5. For example, while shown as a series of steps, various steps in each figure could overlap, occur in parallel, occur in a different order, or occur multiple times. Additionally, FIG. 5 includes example commands for each step of the sequence.

Figure 6:
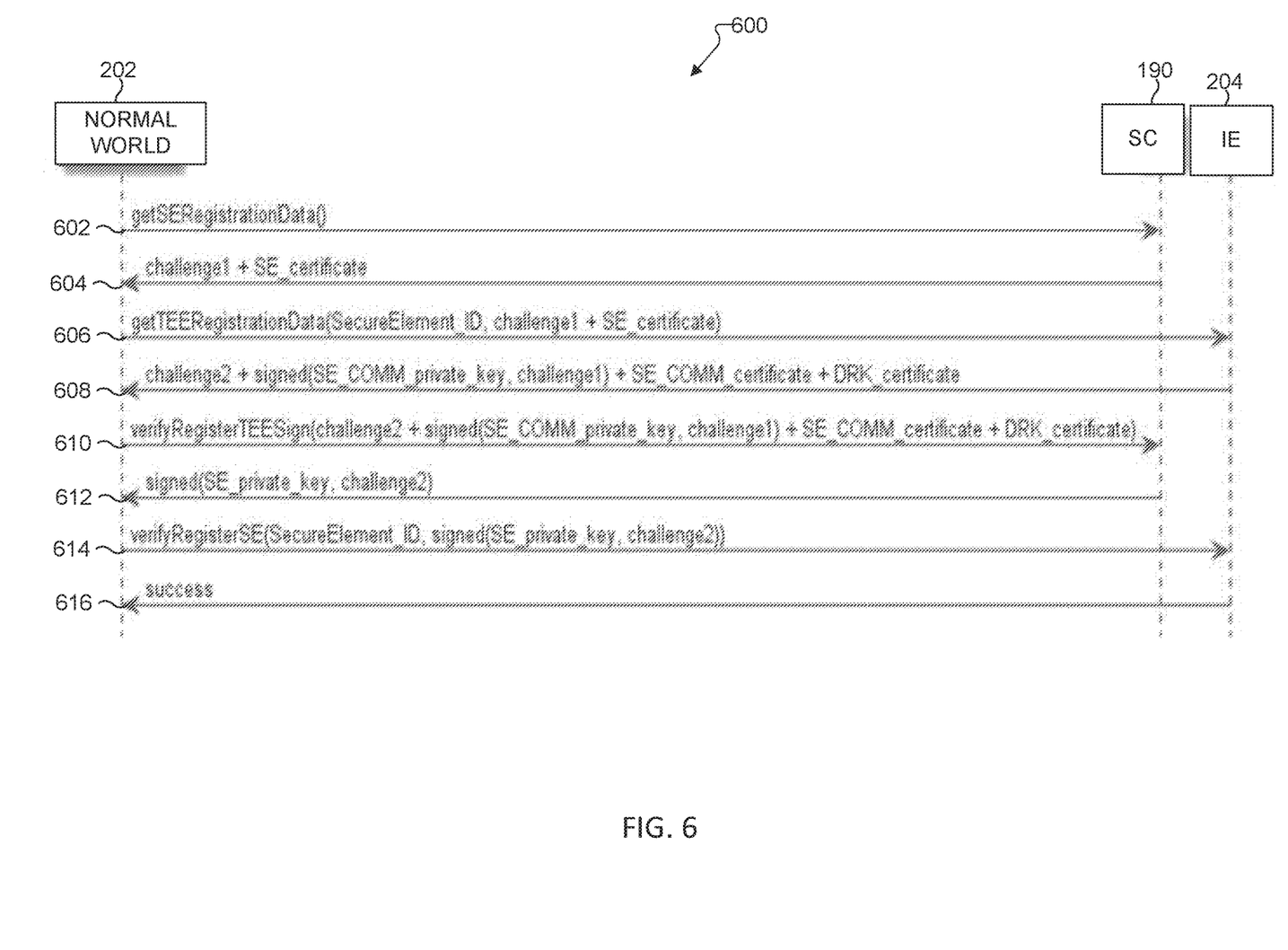
FIG. 6 illustrates a sequence diagram for mutual authentication registration in accordance with an embodiment of this disclosure.

FIG. 6 illustrates a sequence diagram 600 for mutual authentication registration in accordance with an embodiment of this disclosure. The diagram 600 includes a normal world 202, a secure component 190, and an isolated environment 204. In one example embodiment, the IE 204 can be a TEE, the SC 190 can be an SE, and the normal world 202 can be a unified computing system service. This sequence diagram 600 is for illustration only and different portions may be rearranged, added, or removed in different embodiments.

The sequence begins at 602 with the normal world 202 sending a request for secure element registration data from the SC 190. At 604, the SC 190 sends the normal world 202 a security challenge and certificate. At 606, the normal world requests isolation environment registration data, using the challenge and certificate, from the IE 204. At 608, the IE 204 provides security credentials as a response to the challenge. At 608, the IE 204 can also provide its own security challenge to SC 190. At 610, the normal world 202 verifies the security credentials with the SC 190 and provides the security challenge from the IE 204. At 612, the IE 204 provides security credentials as a response to the challenge. If the security credentials are correct, the IE 204 can return a success indicating mutual authentication.

Although FIG. 6 illustrates an example process for mutual authentication registration, various changes could be made to FIG. 6. For example, while shown as a series of steps, various steps in each figure could overlap, occur in parallel, occur in a different order, or occur multiple times. Additionally, FIG. 6 includes example commands for each step of the sequence.

Figure 7:
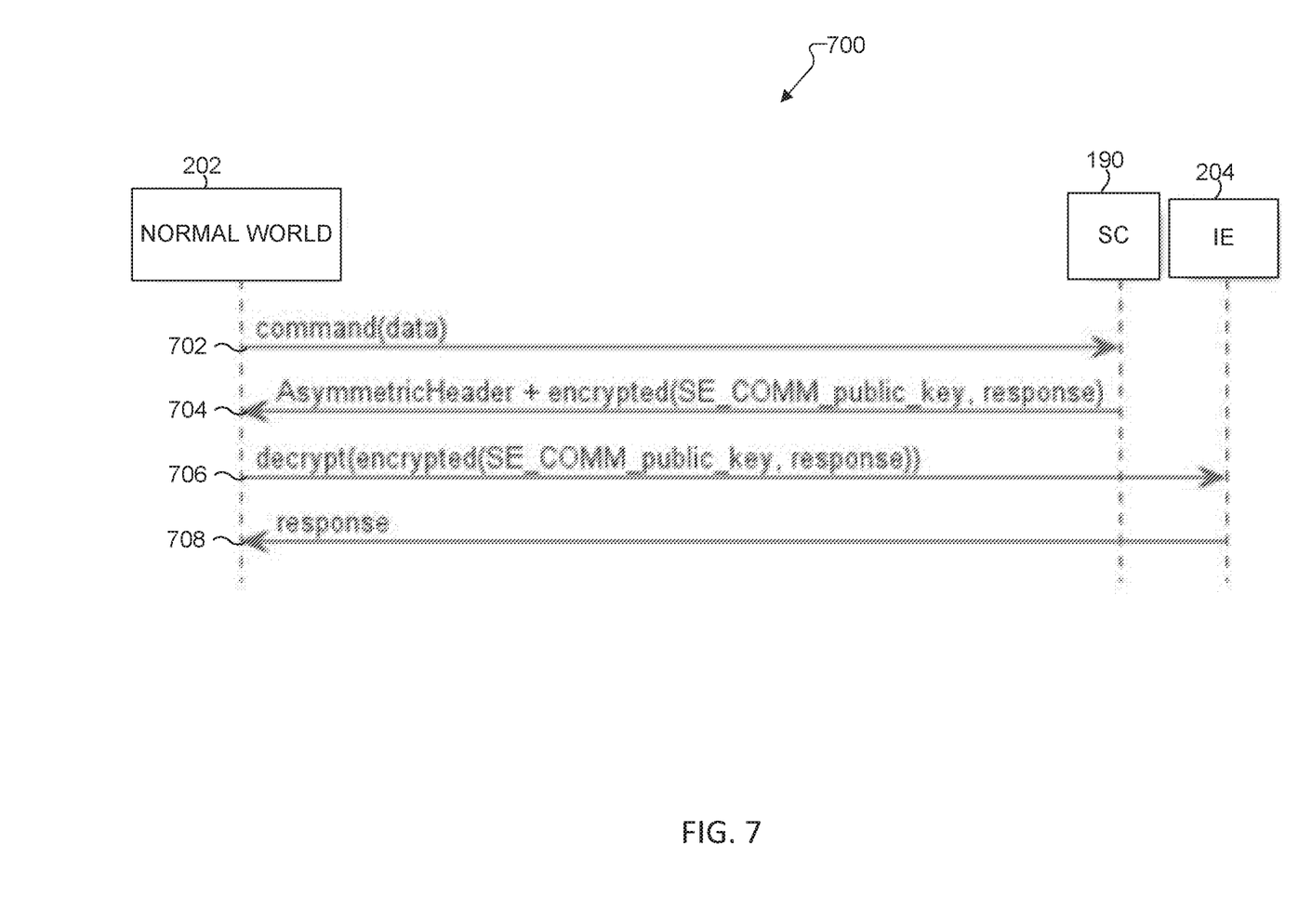
FIG. 7 illustrates a sequence diagram for asymmetric communication in accordance with an embodiment of this disclosure.

FIG. 7 illustrates a sequence diagram 700 for asymmetric communication in accordance with an embodiment of this disclosure. The diagram 700 includes a normal world 202, a secure component 190, and an isolated environment 204. In one example embodiment, the IE 204 can be a TEE, the SC 190 can be an SE, and the normal world 202 can be a unified computing system service. This sequence diagram 700 is for illustration only and different portions may be rearranged, added, or removed in different embodiments.

The sequence begins at 702 with the normal world 202 sending a request for data to the SC 190. At 704, the SC 190 sends the normal world 202 an asymmetric header and encrypted data using the SC 190 public key. At 706, the normal world requests decryption of the data from the IE 204. At 708, the IE 204 provides the decrypted data in a response.

Although FIG. 7 illustrates an example process for mutual authentication registration, various changes could be made to FIG. 7. For example, while shown as a series of steps, various steps in each figure could overlap, occur in parallel, occur in a different order, or occur multiple times. Additionally, FIG. 7 includes example commands for each step of the sequence.

Figure 8:
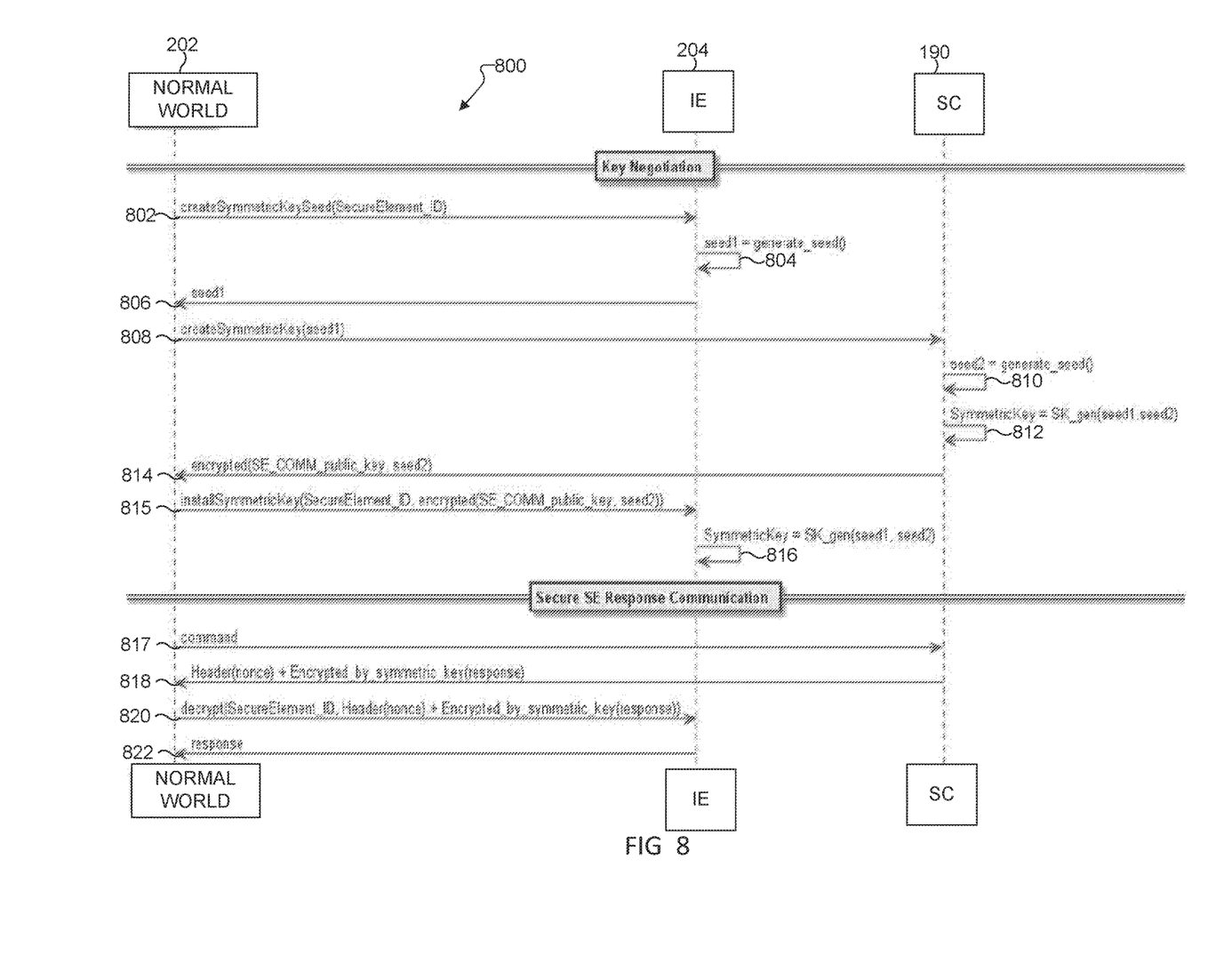
FIG. 8 illustrates a sequence diagram for secure component response communication in accordance with an embodiment of this disclosure.

FIG. 8 illustrates a sequence diagram 800 for secure component 190 response communication in accordance with an embodiment of this disclosure. The diagram 800 includes a normal world 202, a secure component 190, and an isolated environment 204. In one example embodiment, the IE 204 can be a TEE, the SC 190 can be an SE, and the normal world 202 can be a unified computing system service. This sequence diagram 800 is for illustration only and different portions may be rearranged, added, or removed in different embodiments.

In one embodiment, steps 802-816 can be part of a key negotiation between the IE 204 and SC 190. The sequence begins at 802 with the normal world 202 sending a request to the IE 204 to create a symmetric key seed. At step 804, the IE 204 creates a first symmetric key seed. At step 806, the IE 204 sends the first key seed to the normal world 202. At step 808, the normal world 202 sends a request and the first key seed to the SC 190 to create a symmetric key. At step 810, the SC 190 creates a second symmetric key seed. At step 812, the SC 190 creates a symmetric key using the first and second key seeds. At step 814, sends the symmetric key to the normal world 202. At step 815, the normal world 202 sends the symmetric key to IE 204. At step 816, the IE 204 installs the symmetric key.

Steps 817-822 can be part of a secure SC 190 response communication. The sequence begins at 817 with the normal world 202 sending a request for data to the SC 190. At 818, the SC 190 sends the normal world 202 a header and encrypted data using the SC 190 symmetric key. At 820, the normal world requests decryption of the data from the IE 204. At 822, the IE 204 provides the decrypted data in a response using the symmetric key.

Although FIG. 8 illustrates an example process for mutual authentication registration, various changes could be made to FIG. 8. For example, while shown as a series of steps, various steps in each figure could overlap, occur in parallel, occur in a different order, or occur multiple times. Additionally, FIG. 8 includes example commands for each step of the sequence.

Figure 9:
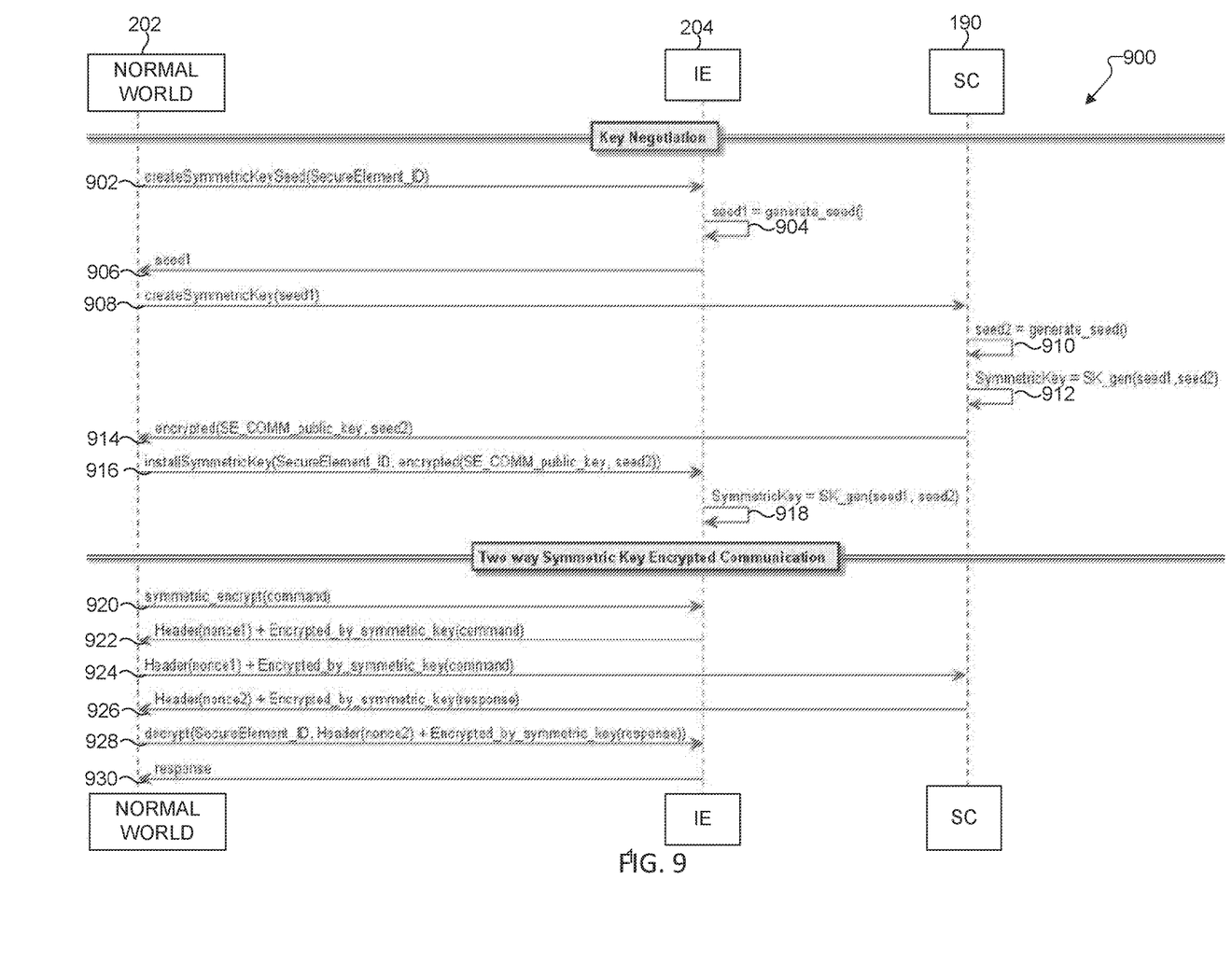
FIG. 9 illustrates a sequence diagram for symmetric key encrypted communication in accordance with an embodiment of this disclosure.

FIG. 9 illustrates a sequence diagram 900 for symmetric key encrypted communication in accordance with an embodiment of this disclosure. The diagram 900 includes a normal world 202, a secure component 190, and an isolated environment 204. In one example embodiment, the IE 204 can be a TEE, the SC 190 can be an SE, and the normal world 202 can be a unified computing system service. This sequence diagram 900 is for illustration only and different portions may be rearranged, added, or removed in different embodiments.

In one embodiment, steps 902-918 can be part of a key negotiation between the IE 204 and SC 190. The sequence begins at 902 with the normal world 202 sending a request to the IE 204 to create a symmetric key seed. At 904 804, the IE 204 creates a first symmetric key seed. At step 906, the IE 204 sends the first key seed to the normal world 202. At step 908, the normal world 202 sends a request and the first key seed to the SC 190 to create a symmetric key. At step 910, the SC 190 creates a second symmetric key seed. At step 912, the SC 190 creates a symmetric key using the first and second key seeds. At step 914, sends the symmetric key to the normal world 202. At step 916, the normal world 202 sends the symmetric key to IE 204. At step 918, the IE 204 installs the symmetric key.

Steps 920-930 can be part of a two-way symmetric key encrypted communication. The sequence begins at 920 with the normal world 202 sending a request for data to the IE 204 for encryption. At 922, the IE 204 returns a header with a first nonce, and the request encrypted with the symmetric key. At 924, the normal world 202 sends the encrypted request and header to the SC 190. At 926, the SC 190 sends the normal world 202 a header with a second nonce, and data encrypted using the symmetric key. At 928, the normal world requests decryption of the data from the IE 204. At 930, the IE 204 provides the decrypted data in a response using the symmetric key.

Although FIG. 9 illustrates an example process for mutual authentication registration, various changes could be made to FIG. 9. For example, while shown as a series of steps, various steps in each figure could overlap, occur in parallel, occur in a different order, or occur multiple times. Additionally, FIG. 9 includes example commands for each step of the sequence.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for secure communication, the method comprising:
    binding an isolated environment, of a device, to a secure component, wherein the secure component includes a secure application and data, wherein the isolated environment to the secure component comprises establishing an encrypted communication channel between the isolated environment and the secure component;

the isolated environment performing a tamper check, wherein performing the tamper check includes:

providing a trusted boot attestation, on an application of the device existing outside of the isolated environment of the device, the application communicating with the secure application of the secure component, and providing a device root key to the secure component;

responsive to the isolated environment not detecting tampering, the isolated environment transmitting an encrypted message to the secure component identifying the application as uncompromised; and utilizing the isolated environment as an intermediary for communication of the data between the secure application and the application of the device, wherein the isolated environment decrypts the communication of the data in the encrypted communication channel from the secure component.

2. The method of claim 1, wherein binding the isolated environment to the secure component comprises:

performing authentication between the isolated environment and the secure component using secured credentials in the isolated environment.

3. The method of claim 1, wherein utilizing the isolated environment as the intermediary for the communication of the data between the secure application and the device further comprises:

responsive to detecting tampering, identifying the application as compromised.

4. The method of claim 1, wherein the secure component is at least partly operated within the isolated environment.

5. The method of claim 1 wherein establishing the encrypted communication channel between the isolated environment and the secure component comprises: establishing at least one of a public key infrastructure or a symmetric encryption.

6. An apparatus for secure communication, the apparatus comprising:

a memory element configured to store data; and at least one processor coupled to the memory element, the at least one processor configured to:

bind an isolated environment, of the apparatus, to a secure component, wherein the secure component includes a secure application and the data;

establish an encrypted communication channel between the isolated environment and the secure component;

perform, by the isolated environment, a tamper check, wherein perform the tamper check includes:

providing a trusted boot attestation, on an application of the apparatus existing outside of the isolated environment of the apparatus, the application communicating with the secure application of the secure component, and providing a device root key to the secure component;

responsive to the isolated environment not detecting tampering, transmit, by the isolated environment, an encrypted message to the secure component to identify the application as uncompromised; and utilize the isolated environment as an intermediary for communication of the data between the secure application and the application of the apparatus, wherein the isolated environment decrypts the communication of the data in the encrypted communication channel from the secure component.

7. The apparatus of claim 6, wherein the at least one processor is further configured to:

perform authentication between the isolated environment and the secure component using secured credentials in the isolated environment.

8. The apparatus of claim 6, wherein the at least one processor is further configured to:

responsive to detecting tampering, identify the application as compromised.

9. The apparatus of claim 6, wherein the secure component is at least partly operated within the isolated environment.

10. The apparatus of claim 6, wherein the at least one processor is further configured to: establish at least one of a public key infrastructure or a symmetric encryption.

11. A non-transitory computer-readable medium comprising instructions for secure communication that, when executed by at least one processor, causes an electronic device to:

bind an isolated environment, of an apparatus, to a secure component, wherein the secure component includes a secure application and data; and establish an encrypted communication channel between the isolated environment and the secure component;

cause the isolated environment to perform a tamper check, wherein perform the tamper check includes:

providing a trusted boot attestation, on an application of the apparatus existing outside of the isolated environment of the apparatus, the application communicating with the secure application of the secure component, and providing a device root key to the secure component;

responsive to the isolated environment not detecting tampering, transmit, by the isolated environment, an encrypted message to the secure component to identify the application as uncompromised; and utilize the isolated environment as an intermediary for communication of the data between the secure application and the application of the apparatus, wherein the isolated environment decrypts the communication of the data in the encrypted communication channel from the secure component.

12. The non-transitory computer-readable medium of claim 11, further comprising instructions that, when executed by the at least one processor, causes the electronic device to:

perform authentication between the isolated environment and the secure component using secured credentials in the isolated environment.

13. The non-transitory computer-readable medium of claim 11, further comprising instructions that, when executed by the at least one processor, causes the electronic device to:

responsive to detecting tampering, identify the application as compromised.

14. The non-transitory computer-readable medium of claim 11, wherein the secure component is at least partly operated within the isolated environment.

15. The method of claim 1, wherein the device root key is installed on both the isolated environment and the secure component.

16. The apparatus of claim 6, wherein the device root key is installed on both the isolated environment and the secure component.

17. The non-transitory computer-readable medium of claim 11, wherein the device root key is installed on both the isolated environment and the secure component.

\* \* \* \* \*